(12) United States Patent
Ogata et al.

(10) Patent No.: US 8,070,650 B2
(45) Date of Patent: Dec. 6, 2011

(54) HYDRAULIC CONTROL SYSTEM

(75) Inventors: Yusuke Ogata, Toyota (JP); Yoshinobu Soga, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 471 days.

(21) Appl. No.: 12/420,130

(22) Filed: Apr. 8, 2009

(65) Prior Publication Data

US 2009/0264231 A1 Oct. 22, 2009

(30) Foreign Application Priority Data

Apr. 18, 2008 (JP) ................. 2008-109390

(51) Int. Cl.
*F16H 61/662* (2006.01)
*F16H 37/02* (2006.01)
(52) U.S. Cl. .......................... 477/48; 475/210
(58) Field of Classification Search .............. 477/39, 477/45, 48; 475/210
See application file for complete search history.

(56) References Cited

U.S. PATENT DOCUMENTS

| 7,356,399 | B2* | 4/2008 | Eguchi et al. ............... 701/61 |
| 2001/0024988 | A1* | 9/2001 | Kashiwase ................... 475/210 |
| 2002/0132698 | A1* | 9/2002 | Rienks et al. ................ 477/48 |

FOREIGN PATENT DOCUMENTS

| JP | 3-213773 | 9/1991 |
| JP | 8-4864 | 1/1996 |
| JP | 11-182666 | 7/1999 |
| JP | 2001-65684 | 3/2001 |
| JP | 2006-153104 | 6/2006 |
| JP | 2007-46620 | 2/2007 |

* cited by examiner

*Primary Examiner* — Edwin A Young
(74) *Attorney, Agent, or Firm* — Oblon, Spivak, McClelland, Maier & Neustadt, L.L.P.

(57) ABSTRACT

A hydraulic control system of a vehicle power train having a belt-type continuously variable transmission, and a hydraulic lock-up clutch, includes: a line pressure control valve; first and second control valves; first, second and third electromagnetic valves; and a fail-safe valve. The fail-safe valve is switched to a fail position in which a line pressure is supplied to one of a drive pulley and a driven pulley when a rapid deceleration state is likely to occur in the belt-type continuously variable transmission, the fail-safe valve is switched to a normal position in which a hydraulic pressure output from the first control valve is supplied to the one of the drive pulley and the driven pulley during times other than the above, and the fail-safe valve is switched by a combination of a hydraulic pressure controlled by the second electromagnetic valve and a hydraulic pressure controlled by the third electromagnetic valve.

12 Claims, 3 Drawing Sheets

HYDRAULIC CONTROL SYSTEM

INCORPORATION BY REFERENCE

The disclosure of Japanese Patent Application No. 2008-109390 filed on Apr. 18, 2008 including the specification, drawings and abstract is incorporated herein by reference in its entirety.

BACKGROUND OF THE INVENTION

1. Field of the Invention

The invention relates to a hydraulic control system of a vehicle power train.

2. Description of the Related Art

Some of known power trains mounted on vehicles include a belt-type continuously variable transmission, a hydraulic lock-up clutch, and the like. The belt-type continuously variable transmission clamps a belt by hydraulic pressure to transmit power, and changes the belt winding diameters to vary speed ratios. The hydraulic lock-up clutch is provided in a fluid power transmission device that is arranged in a power transmission path between a power source and the belt-type continuously variable transmission.

A hydraulic control system of such a vehicle power train includes a large number of various control valves, electromagnetic valves for controlling the control valves, and the like. For example, the hydraulic control system includes a line pressure control valve, a shift hydraulic pressure control valve, a clamping hydraulic pressure control valve, a lock-up control valve, and the like. The line pressure control valve regulates a line pressure, which is a source pressure (control source pressure) of hydraulic pressures at various portions. The shift hydraulic pressure control valve regulates the line pressure, which is the source pressure, and supplies a drive pulley (primary pulley) of the belt-type continuously variable transmission with a shift hydraulic pressure by which the speed ratio of the belt-type continuously variable transmission is controlled. The clamping hydraulic pressure control valve also regulates the line pressure, which is the source pressure, and supplies a driven pulley (secondary pulley) of the belt-type continuously variable transmission with a clamping hydraulic pressure by which the belt clamping pressure of the belt-type continuously variable transmission is controlled. The lock-up control valve operates when the lock-up clutch is engaged or released. In addition, the hydraulic control system includes electromagnetic valves, such as a linear electromagnetic valve, an on/off electromagnetic valve and a duty-controlled electromagnetic valve.

Japanese Patent Application Publication No. 3-213773 (JP-A-3-213773) and Japanese Patent Application Publication No. 2006-153104 (JP-A-2006-153104) describe a hydraulic control system of a belt-type continuously variable transmission. In addition, JP-A-2006-153104 describes a control that is executed when an electromagnetic valve that controls a shift hydraulic pressure control valve or an electromagnetic valve that controls a clamping hydraulic pressure control valve fails.

Incidentally, in the hydraulic control system, control valves or electromagnetic valves that control the control valves may fail because of a mechanical factor, such as a valve stick, or may fail because of an electrical factor, such as a disconnection or a short-circuit in the electromagnetic valves. However, the hydraulic control system of the existing belt-type continuously variable transmission supplies a shift hydraulic pressure to the drive pulley only from the shift hydraulic pressure control valve. Thus, if the shift hydraulic pressure control valve or the electromagnetic valve that controls the shift hydraulic pressure control valve fails, a shift hydraulic pressure controlling a speed ratio may steeply decreases, causing the belt-type continuously variable transmission to be placed in a rapid deceleration state. Then, in a rapid deceleration state, a belt slip, an overrevolution (overspeed), an axle lock, or the like, may occur.

As measures for avoiding such rapid deceleration in the event of a failure, a control valve, or the like, having a back-up function may be provided for the hydraulic control system. However, in this case, it is necessary to further provide another electromagnetic valve for controlling the control valve having a back-up function. This problematically leads to an increase in cost and an increase in size of the system.

JP-A-3-213773 does not describe such measures in the event of a failure. In addition, JP-A-2006-153104 describes measures against a failure in the electromagnetic valve that controls the shift hydraulic pressure control valve, but does not describe measures against a failure in the shift hydraulic pressure control valve itself.

SUMMARY OF THE INVENTION

The invention provides a hydraulic control system that is able to avoid occurrence of a rapid deceleration state in a belt-type continuously variable transmission without providing an additional electromagnetic valve.

An aspect of the invention provides a hydraulic control system of a vehicle power train. The vehicle power train includes a belt-type continuously variable transmission that clamps a belt using a hydraulic pressure to transmit power and that changes belt winding diameters to vary speed ratios, and a hydraulic lock-up clutch that is provided for a fluid power transmission device arranged between a power source and the belt-type continuously variable transmission and that directly couples the power source to the belt-type continuously variable transmission. The hydraulic control system includes: a line pressure control valve that regulates a line pressure, which is a source pressure of hydraulic pressures used at various portions; a first control valve that outputs a hydraulic pressure supplied to one of a drive pulley and a driven pulley of the belt-type continuously variable transmission; a first electromagnetic valve that controls the hydraulic pressure output from the first control valve; a second control valve that outputs a hydraulic pressure supplied to the other one of the drive pulley and the driven pulley; a second electromagnetic valve that controls the hydraulic pressure output from the second control valve; a third electromagnetic valve that controls an engagement pressure of the lock-up clutch; and a fail-safe valve that switches a hydraulic pressure supplied to the one of the drive pulley and the driven pulley between the hydraulic pressure output from the first control valve and the line pressure. The fail-safe valve is switched to a fail position in which the line pressure is supplied to the one of the drive pulley and the driven pulley when a rapid deceleration state is likely to occur in the belt-type continuously variable transmission, the fail-safe valve is switched to a normal position in which the hydraulic pressure output from the first control valve is supplied to the one of the drive pulley and the driven pulley during normal times other than times when a rapid deceleration state is likely to occur in the belt-type continuously variable transmission, and the fail-safe valve is switched by a combination of a hydraulic pressure controlled by the second electromagnetic valve and a hydraulic pressure controlled by the third electromagnetic valve.

With the above hydraulic control system, when a rapid deceleration state is likely to occur in the belt-type continuously variable transmission, the fail-safe valve is switched to the fail position to supply the line pressure to the one of the drive pulley and the driven pulley of the belt-type continuously variable transmission. Thus, it is possible to avoid occurrence of a rapid deceleration state. That is, it is possible to suppress a variation in the speed ratio to the deceleration side by introducing the line pressure to the one of the drive pulley and the driven pulley. Then, it is possible to prevent a belt slip, an overrevolution, an axle lock, or the like, that may occur in accordance with rapid deceleration. In addition, because the existing electromagnetic valves (the second electromagnetic valve and the third electromagnetic valve) are used for switching the fail-safe valve, it is possible to avoid an increase in cost and an increase in size of the system.

Here, specifically, a rapid deceleration state may be likely to occur in the belt-type continuously variable transmission when a hydraulic pressure supplied to the one of the drive pulley and the driven pulley decreases or when a hydraulic pressure supplied to the other one of the drive pulley and the driven pulley increases.

In addition, the fail-safe valve may be switched to the fail position when both the hydraulic pressure controlled by the second electromagnetic valve and the hydraulic pressure controlled by the third electromagnetic valve are maximum pressures or hydraulic pressures close to the maximum pressures. In other words, in regard to each of the hydraulic pressure controlled by the second electromagnetic valve and the hydraulic pressure controlled by the third electromagnetic valve, a range including a maximum pressure and a hydraulic pressure close to the maximum pressure may be set as a range used to switch the fail-safe valve to the fail position (range used in the event of a failure).

With the above hydraulic control system, both the second electromagnetic valve and the third electromagnetic valve are used for switching the fail-safe valve. Thus, in comparison with the case in which the fail-safe valve is switched by a single solenoid, it is possible to narrow the range used in the event of a failure, the range being set for each of the hydraulic pressure controlled by the second electromagnetic valve and the hydraulic pressure controlled by the third electromagnetic valve. Hence, it is possible to suppress an increase in source pressure of each of the second electromagnetic valve and the third electromagnetic valve in accordance with setting of the range used in the event of a failure, and, as a result, it is possible to suppress the flow rate consumed by each of the second electromagnetic valve and the third electromagnetic valve. In addition, it is possible to suppress an increase in control gain of each of the second electromagnetic valve and the third electromagnetic valve in accordance with setting of the range used in the event of a failure, and, therefore, it is possible to suppress deterioration of controllability of each of the hydraulic pressure controlled by the second electromagnetic valve and the hydraulic pressure controlled by the third electromagnetic valve.

In addition, in regard to each of the hydraulic pressure controlled by the second electromagnetic valve and the hydraulic pressure controlled by the third electromagnetic valve, a range used to switch the fail-safe valve to the fail position may overlap a range used for control during normal times. By so doing, it is possible to prevent an increase in source pressure of each of the second electromagnetic valve and the third electromagnetic valve, and, therefore, it is possible to prevent an increase in control gain of each of the second electromagnetic valve and the third electromagnetic valve.

Incidentally, by switching the fail-safe valve to the fail position, a variation in the speed ratio to the deceleration side is suppressed in the event of a failure. However, if the line pressure introduced to the one of the drive pulley and the driven pulley is excessively high, the speed ratio may reversely vary to the acceleration side. In addition, even when a rapid deceleration may be prevented in a driving state (power on state) by a line pressure introduced to the one of the drive pulley and the driven pulley, the speed ratio may vary to the acceleration side in a driven state (power off state). Thus, when the vehicle stops in a state where the speed ratio is varied to the acceleration side, driving force may possibly be insufficient at the time when the vehicle starts running again.

Then, in the hydraulic control system, in a state where the fail-safe valve is placed in the fail position, when a vehicle speed is lower than or equal to a predetermined vehicle speed, the fail-safe valve may be returned to the normal position. Here, the predetermined vehicle speed may be set at a value such that an overrevolution does not occur when the fail-safe valve is returned to the normal position. Alternatively, the predetermined vehicle speed may be set at a value such that an axle does not lock when the fail-safe valve is returned to the normal position.

By so doing, the fail-safe valve is returned to a state before being switched to the fail position, so the line pressure is not introduced to the one of the drive pulley and the driven pulley. Thus, a variation in the speed ratio to the acceleration side is inhibited, thus allowing the speed ratio to vary to the deceleration side again. Thus, when the vehicle stops, the vehicle may start running again in a state where the speed ratio is set in a full deceleration state or a state close to the full deceleration state. As a result, it is possible to avoid a situation that driving force is insufficient.

In addition, in the hydraulic control system, the vehicle power train may be equipped with a hydraulic frictional engagement element (forward clutch, reverse brake, or the like) that is engaged to form a power transmission path for driving a vehicle, and wherein the second electromagnetic valve may control a transient hydraulic pressure supplied to the frictional engagement element when the frictional engagement element is in transition to engagement. That is, the second electromagnetic valve may be configured to control a transient hydraulic pressure of the frictional engagement element at the time of engagement in addition to the control on the hydraulic pressure output from the second control valve and the control for switching the fail-safe valve.

Here, when a rapid deceleration state is likely to occur in the belt-type continuously variable transmission, any one of the following hydraulic pressures may be supplied to the one of the drive pulley and the driven pulley, instead of the line pressure.

(1) The hydraulic pressure output from the second control valve is supplied to the one of the drive pulley and the driven pulley.

(2) A source pressure of any one of the first to third electromagnetic valves is supplied to the one of the drive pulley and the driven pulley.

(3) When the vehicle power train is equipped with the frictional engagement element, a hydraulic pressure supplied to the frictional engagement element for holding the frictional engagement element is supplied to the one of the drive pulley and the driven pulley, instead of the line pressure.

According to the aspect of the invention, it is possible to suppress a variation in the speed ratio to the deceleration side by introducing the line pressure to the one of the drive pulley and the driven pulley of the belt-type continuously variable transmission. Then, it is possible to prevent a belt slip, an overrevolution, an axle lock, or the like, that may occur in accordance with a rapid deceleration. In addition, because the existing electromagnetic valves (the second electromagnetic valve and the third electromagnetic valve) are used for switching the fail-safe valve, it is possible to avoid an increase in cost and an increase in size of the system.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
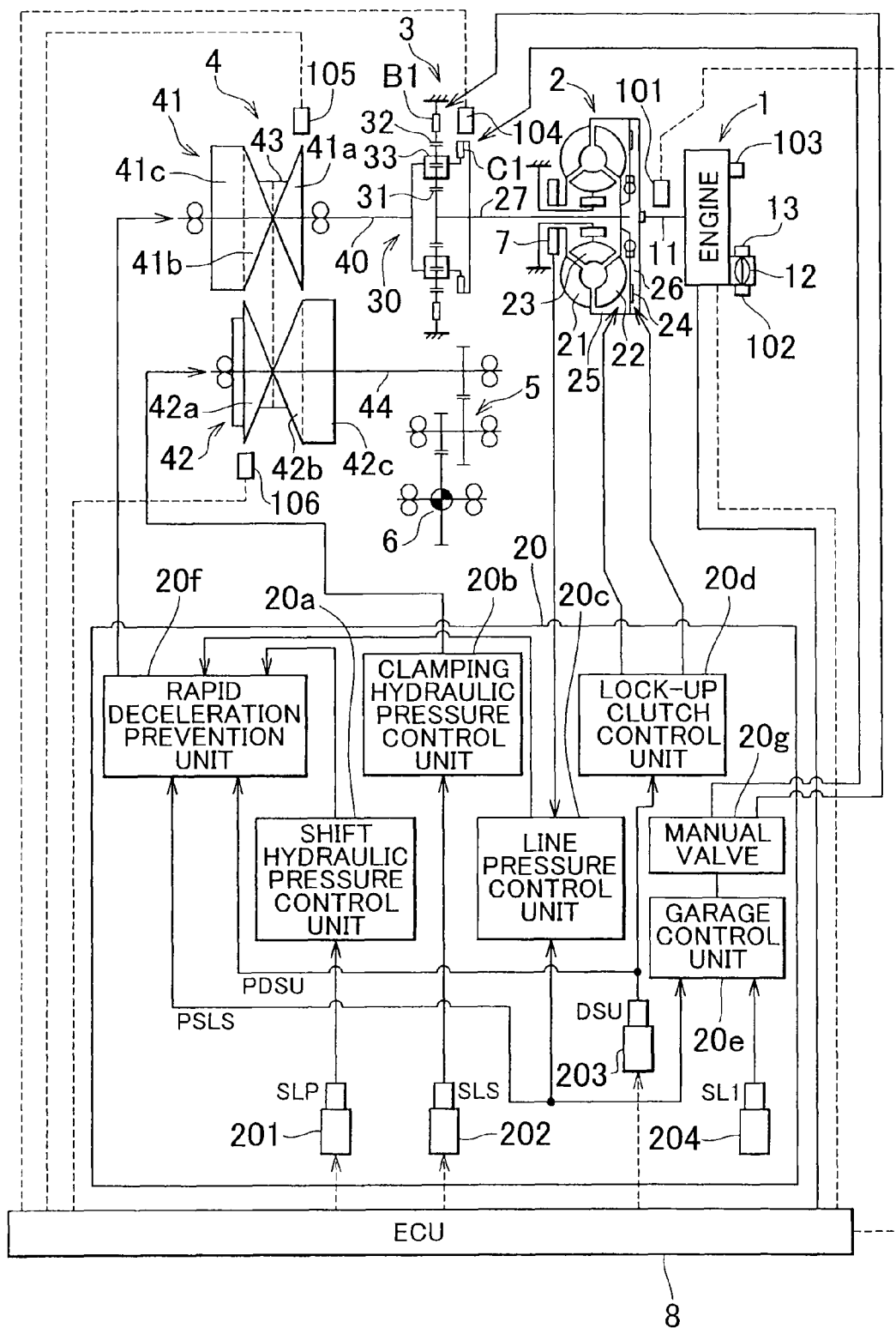
FIG. 1 is a schematic configuration diagram that shows a vehicle according to an embodiment of the invention.

An embodiment of the invention will be described with reference to the accompanying drawings. FIG. 1 is a schematic configuration diagram that shows a vehicle according to an embodiment of the invention. The vehicle illustrated in FIG. 1 is a front-engine front-drive (FF) vehicle. The vehicle includes an engine (internal combustion engine) 1, which is a power source for driving the vehicle, a torque converter 2, which serves as a fluid power transmission device, a forward-reverse switching device 3, a belt-type continuously variable transmission (CVT) 4, a reduction gear 5, a differential gear unit 6, and an electronic control unit (ECU) 8, which serves as a controller.

A crankshaft 11, which is an output shaft of the engine 1, is coupled to the torque converter 2. The power output from the engine 1 is transmitted from the torque converter 2 through the forward-reverse switching device 3, the belt-type continuously variable transmission 4 and the reduction gear 5 to the differential gear unit 6. Then, the transmitted power is distributed to right and left drive wheels (not shown). In the above vehicle, a power train is formed of the torque converter 2, the forward-reverse switching device 3, the belt-type continuously variable transmission 4, and the like.

The engine 1 is, for example, a multi-cylinder gasoline engine. The amount of air taken in to the engine 1 (note: the amount of air means the flow rate of air, and this also applies to the following description) is adjusted by an electronically controlled throttle valve 12. The throttle opening degree of the throttle valve 12 may be electronically controlled independently of driver's accelerator pedal operation, and the opening degree (throttle opening degree) is detected by a throttle opening degree sensor 102. In addition, a coolant temperature of the engine 1 is detected by a coolant temperature sensor 103.

The throttle opening degree of the throttle valve 12 is controlled by the ECU 8. Specifically, the ECU 8 controls the throttle opening degree of the throttle valve 12 so as to obtain an optimal intake air amount (target intake air amount (note: the intake air amount means intake air flow rate, and this also applies to the following description)) on the basis of an operating state of the engine 1, such as an engine rotational speed Ne detected by an engine rotational speed sensor 101 and a driver's accelerator pedal depression amount (accelerator operation amount Acc). More specifically, an actual throttle opening degree of the throttle valve 12 is detected by the throttle opening degree sensor 202, and a throttle motor 13 of the throttle valve 12 is feedback-controlled so that the actual throttle opening degree coincides with the throttle opening degree (target throttle opening degree) that gives the target intake air amount.

The torque converter 2 includes an input side pump impeller 21, an output side turbine runner 22, and a stator 23 that provides a torque amplifying function. Power is transmitted between the pump impeller 21 and the turbine runner 22 via fluid. The pump impeller 21 is coupled to the crankshaft 11 of the engine 1. The turbine runner 22 is coupled to the forward-reverse switching device 3 via a turbine shaft 27.

The torque converter 2 is provided with a lock-up clutch 24 that directly couples the input side and output side of the torque converter 2. The lock-up clutch 24 is completely engaged, half engaged (engaged in a slipped state) or released by controlling the engagement pressure of the lock-up clutch 24, that is, specifically, by controlling a differential pressure (lock-up differential pressure) between a hydraulic pressure in an engagement side fluid chamber 25 and a hydraulic pressure in a release side fluid chamber 26.

As the lock-up clutch 24 is completely engaged, the pump impeller 21 and the turbine runner 22 rotate integrally. In addition, as the lock-up clutch 24 is engaged in a predetermined slipped state (half engaged state), the turbine runner 22 is driven for rotation following the pump impeller 21 at a predetermined slip rate. On the other hand, as a lock-up differential pressure is set to a negative value, the lock-up clutch 24 is released.

Then, the torque converter 2 includes a mechanical oil pump (hydraulic pressure generating source) 7 that is coupled to the pump impeller 21 and driven by the pump impeller 21.

The forward-reverse switching device 3 includes a double pinion type planetary gear mechanism 30, a forward clutch C1, and a reverse brake B1.

A sun gear 31 of the planetary gear mechanism 30 is integrally coupled to the turbine shaft 27 of the torque converter 2, and a carrier 33 is integrally coupled to an input shaft 40 of the belt-type continuously variable transmission 4. In addition, these carrier 33 and sun gear 31 are selectively coupled to each other via the forward clutch C1, and a ring gear 32 is selectively fixed to a housing via the reverse brake B1.

The forward clutch C1 and the reverse brake B1 are hydraulic frictional engagement elements for driving the vehicle. The forward clutch C1 and the reverse brake B1 are engaged or released by a hydraulic control circuit 20, which will be described later. When the forward clutch C1 is engaged and the reverse brake B1 is released, the forward-reverse switching device 3 enters an integrally rotating state to form (obtain) a forward power transmission path. In this state, forward driving force is transmitted to the belt-type continuously variable transmission 4 side.

On the other hand, when the reverse brake B1 is engaged and the forward clutch C1 is released, the forward-reverse switching device 3 forms (obtains) a reverse power transmission path. In this state, the input shaft 40 rotates in a direction opposite to a direction in which the turbine shaft 27 rotates, and the reverse driving force is transmitted to the belt-type continuously variable transmission 4 side. In addition, when both the forward clutch C1 and the reverse brake B1 are released, the forward-reverse switching device 3 enters neutral (disconnected state) in which power transmission is interrupted.

The belt-type continuously variable transmission 4 includes an input side primary pulley 41, an output side secondary pulley 42, and a metal belt 43 wound around these primary pulley 41 and the secondary pulley 42.

The primary pulley 41 is a variable pulley of which the effective diameter is variable. The primary pulley 41 includes a fixed sheave 41a and a movable sheave 41b. The fixed sheave 41a is fixed to the input shaft 40. The movable sheave 41b is arranged on the input shaft 40 so that the movable sheave 41b is slidable only in the axial direction. Similarly, the secondary pulley 42 is a variable pulley of which the effective diameter is variable. The secondary pulley 42 includes a fixed sheave 42a and a movable sheave 42b. The fixed sheave 42a is fixed to an output shaft 44. The movable sheave 42b is arranged on the output shaft 44 so that the movable sheave 42b is slidable only in the axial direction.

A hydraulic actuator 41c is arranged at the movable sheave 41b side of the primary pulley 41 in order to change the width of a V-groove formed between the fixed sheave 41a and the movable sheave 41b. In addition, similarly, a hydraulic actuator 42c is arranged at the movable sheave 42b side of the secondary pulley 42 in order to change the width of a V-groove formed between the fixed sheave 42a and the movable sheave 42b.

In the thus configured belt-type continuously variable transmission 4, a hydraulic pressure (shift hydraulic pressure) applied to the hydraulic actuator 41c of the primary pulley 41 is controlled to change the V-groove width of each of the primary pulley 41 and the secondary pulley 42. Thus, the winding diameters (effective diameters) of the belt 43 are changed, and a speed ratio γ (=primary pulley rotational speed (input shaft rotational speed) Nin/secondary pulley rotational speed (output shaft rotational speed) Nout) continuously varies. In addition, a hydraulic pressure (clamping hydraulic pressure) applied to the hydraulic actuator 42c of the secondary pulley 42 is controlled so that the belt 43 is clamped at a predetermined clamping force at which no belt slip occurs. The above control is carried out by the ECU 8 and the hydraulic control circuit 20.

As shown in FIG. 1, the hydraulic control circuit 20 includes a shift hydraulic pressure control unit 20a, a clamping hydraulic pressure control unit 20b, a line pressure control unit 20c, a lock-up clutch control unit 20d, a garage control unit 20e, a rapid deceleration prevention unit 20f and a manual valve 20g. The shift hydraulic pressure control unit 20a controls a hydraulic pressure applied to the hydraulic actuator 41c of the primary pulley 41 of the belt-type continuously variable transmission 4 via the rapid deceleration prevention unit 20f. The clamping hydraulic pressure control unit 20b controls a hydraulic pressure applied to the hydraulic actuator 42c of the secondary pulley 42. The line pressure control unit 20c controls a line pressure PL, which is a source pressure (control source pressure) of hydraulic pressures used at various portions. The lock-up clutch control unit 20d controls engagement and release of the lock-up clutch 24. The garage control unit 20e controls engagement and release of the frictional engagement elements (the forward clutch C1 and the reverse brake B1). The rapid deceleration prevention unit 20f prevents a rapid deceleration state in the belt-type continuously variable transmission 4. The hydraulic control circuit 20 includes a linear solenoid (SLP) 201, a linear solenoid (SLS) 202, a duty solenoid (DSU) 203 for controlling lock-up engagement pressure, and an on/off solenoid (SL1) 204. Control signals are supplied from the ECU 8 to these solenoids.

Figure 2:
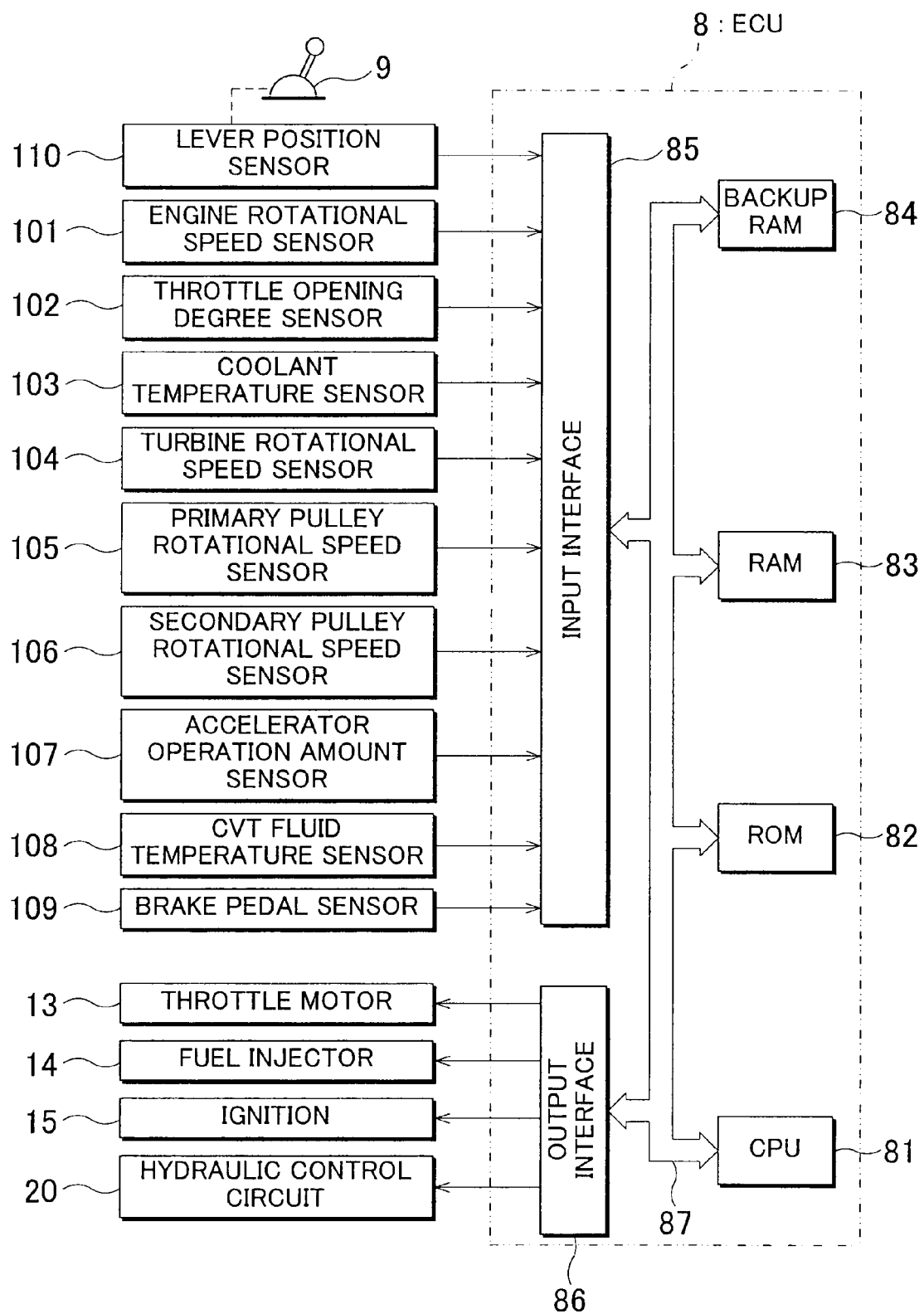
FIG. 2 is a block diagram that shows the configuration of a control system, such as an ECU, of the vehicle shown in FIG. 1.

Next, the ECU 8 will be described with reference to FIG. 2. As shown in FIG. 2, the ECU 8 includes a CPU 81, a ROM 82, a RAM 83, a backup RAM 84, and the like.

The ROM 82 stores various control programs and maps, or the like, that are referred to when those various control programs are executed. The CPU 81 executes processing on the basis of the various control programs and the maps, which are stored in the ROM 82. In addition, the RAM 83 is a memory that temporarily stores results processed in the CPU 81, data input from the sensors, and the like. The backup RAM 84 is a nonvolatile memory that stores data, and the like, that should be saved when the engine 1 is stopped.

These CPU 81, ROM 82, RAM 83 and backup RAM 84 are connected one another via a bidirectional bus 87, and are further connected to an input interface 85 and an output interface 86.

Various sensors are connected to the input interface 85. The various sensors detect an operating state (or running state) of the vehicle. Specifically, the engine rotational speed sensor 101, the throttle opening degree sensor 102, the coolant temperature sensor 103, a turbine rotational speed sensor 104, a primary pulley rotational speed sensor 105, a secondary pulley rotational speed sensor 106, an accelerator operation amount sensor 107, a CVT fluid temperature sensor 108, a brake pedal sensor 109 and a lever position sensor 110 are connected to the input interface 85. The lever position sensor 110 detects a lever position (operating position) of a shift lever 9. Then, the ECU 8 is supplied with signals output from the various sensors, that is, signals that indicate a rotational speed (engine rotational speed) Ne of the engine 1, a throttle opening degree θth of the throttle valve 12, a coolant temperature Tw of the engine 1, a rotational speed (turbine rotational speed) Nt of the turbine shaft 27, a primary pulley rotational speed (input shaft rotational speed) Nin, a secondary pulley rotational speed (output shaft rotational speed) Nout, an operation amount (accelerator operation amount) Acc of the accelerator pedal, a fluid temperature of the hydraulic control circuit 20 (CVT fluid temperature Thc), presence or absence of operation of a foot brake (brake on/off), which is a service brake, and a lever position (operating position) of the shift lever 9.

The throttle motor 13, a fuel injector 14, an ignition 15 and the hydraulic control circuit 20 are connected to the output interface 86.

Here, among the signals supplied to the ECU 8, the turbine rotational speed Nt coincides with the primary pulley rotational speed (input shaft rotational speed) Nin during forward running mode in which the forward clutch C1 of the forward-reverse switching device 3 is engaged, and the secondary pulley rotational speed (output shaft rotational speed) Nout corresponds to a vehicle speed V. In addition, the accelerator operation amount Acc indicates the amount of power required by the driver.

In addition, the shift lever 9 is selectively operated to shift positions, such as a park position "P" for parking, a reverse position "R" for reverse running, a neutral position "N" for interrupting power transmission, a drive position "D" for forward running, and a manual position "M" for manually increasing or decreasing a speed ratio γ of the belt-type continuously variable transmission 4 when forward running is performed in a so-called manual mode. The manual position "M" provides a downshift position for increasing the speed ratio γ, an upshift position for decreasing the speed ratio γ, a plurality of range positions in which a plurality of shift ranges having different upper limit shift ranges (sides at which the speed ratio γ is smaller) may be selected, or the like. The lever position sensor 110 has a plurality of on/off switches, or the like, that detect that the shift lever 9 is operated to, for example, the parking position "P", the reverse position "R", the neutral position "N", the drive position "D", the manual position "M", the upshift position, the downshift position, the range position, or the like.

Then, on the basis of signals output from the various sensors, or the like, the ECU 8 executes various types of control, such as control on the power of the engine 1, control for regulating a hydraulic pressure (shift hydraulic pressure) supplied to the hydraulic actuator 41c of the primary pulley 41 of the belt-type continuously variable transmission 4 and a hydraulic pressure (clamping hydraulic pressure) supplied to the hydraulic actuator 42c of the secondary pulley 42, control for regulating the line pressure PL, control for engagement and release of the frictional engagement elements (the forward clutch C1 and the reverse brake B1), and control for engagement and release of the lock-up clutch 24.

Next, within the hydraulic control circuit 20, portions related to the shift hydraulic pressure control unit 20a, the clamping hydraulic pressure control unit 20b, the line pressure control unit 20c, the lock-up clutch control unit 20d, the garage control unit 20e, and the rapid deceleration prevention unit 20f will be described with reference to FIG. 3. Note that the hydraulic control circuit shown in FIG. 3 is part of the entire hydraulic control circuit 20.

Figure 3:
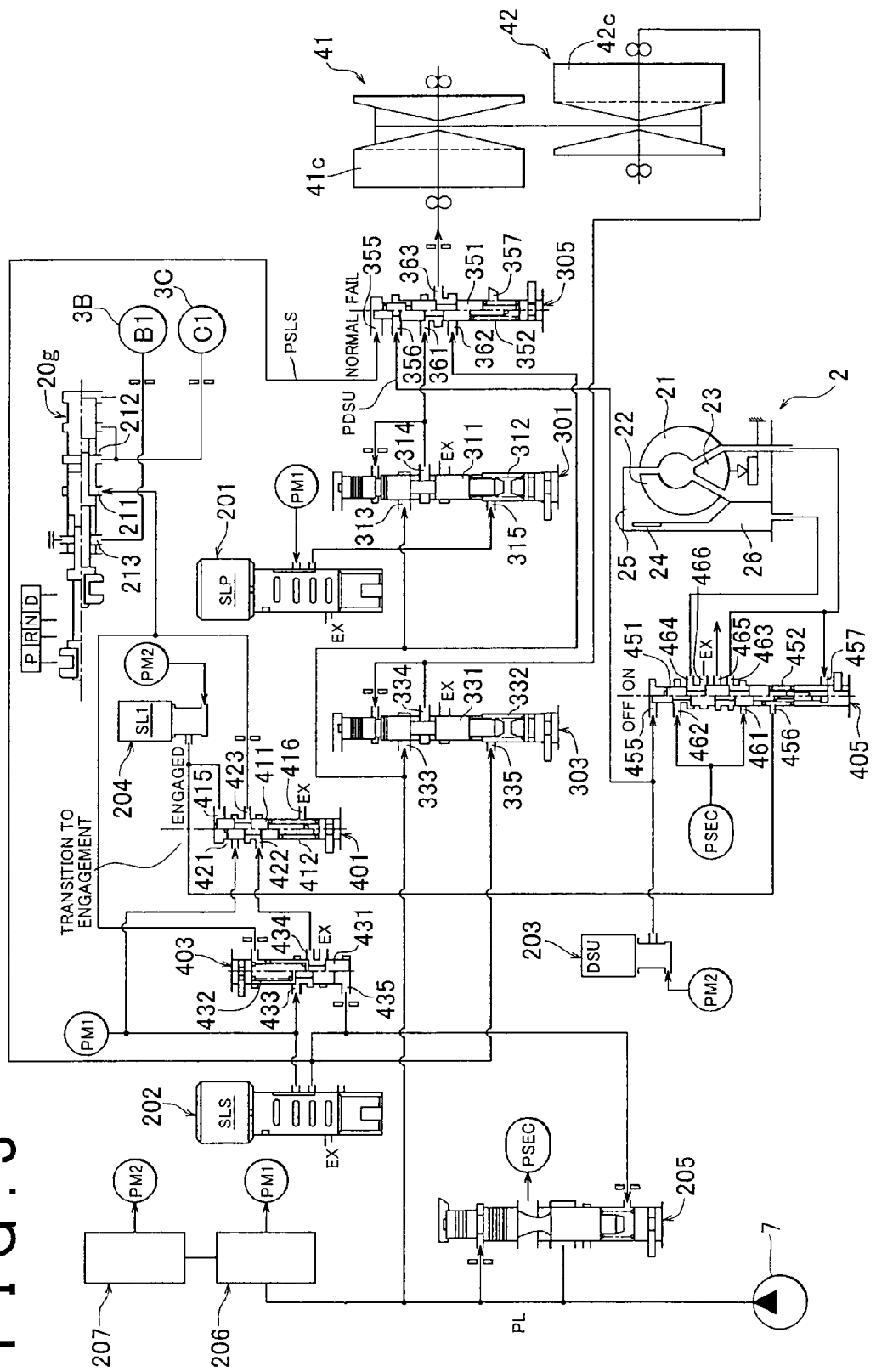
FIG. 3 is a circuit configuration diagram that shows a hydraulic control system of the vehicle shown in FIG. 1.

The hydraulic control circuit shown in FIG. 3 includes the oil pump 7, the manual valve 20g, the linear solenoid (SLP) 201, the linear solenoid (SLS) 202, the duty solenoid (DSU) 203, the on/off solenoid (SL1) 204, a primary regulator valve 205, a first modulator valve 206, a second modulator valve 207, a shift hydraulic pressure control valve 301, a clamping hydraulic pressure control valve 303, a fail-safe valve 305, a clutch apply control valve 401, a clutch pressure control valve 403, and a lock-up control valve 405.

As shown in FIG. 3, a hydraulic pressure generated by the oil pump 7 is regulated by the primary regulator valve 205 to generate the line pressure PL. The primary regulator valve 205 is supplied with a controlled hydraulic pressure output from the linear solenoid (SLS) 202, and operates using the controlled hydraulic pressure as a pilot pressure. Then, the line pressure PL regulated by the primary regulator valve 205 is supplied to the first modulator valve 206, the shift hydraulic pressure control valve 301 and the clamping hydraulic pressure control valve 303. In addition, when the fail-safe valve 305 is switched to a fail position shown at the right half side of the fail-safe valve 305 in FIG. 3, the line pressure PL is supplied to the hydraulic actuator 41c of the primary pulley 41 of the belt-type continuously variable transmission 4.

The first modulator valve 206 is a pressure regulating valve that regulates the line pressure PL, regulated by the primary regulator valve 205, to a certain hydraulic pressure (first modulator hydraulic pressure PM1) lower than the line pressure PL. The first modulator hydraulic pressure PM1 output from the first modulator valve 206 is supplied to the linear solenoid (SLP) 201, the linear solenoid (SLS) 202, the second modulator valve 207, and the clutch pressure control valve 403, and is also supplied to the manual valve 20g via the clutch apply control valve 401.

The second modulator valve 207 is a pressure regulating valve that regulates the first modulator hydraulic pressure PM1, regulated by the first modulator valve 206, to a certain hydraulic pressure (second modulator hydraulic pressure PM2) lower than the first modulator hydraulic pressure PM1. The second modulator hydraulic pressure PM2 output from the second modulator valve 207 is supplied to the duty solenoid (DSU) 203 and the on/off solenoid (SL1) 204.

The linear solenoid (SLP) 201 and the linear solenoid (SLS) 202 are normally open solenoid valves. The linear solenoid (SLP) 201 and the linear solenoid (SLS) 202 each output a controlled hydraulic pressure (output hydraulic pressure) on the basis of an electric current value determined by a duty signal (duty value) transmitted from the ECU 8. The controlled hydraulic pressure output from the linear solenoid (SLP) 201 is supplied to the shift hydraulic pressure control valve 301. The controlled hydraulic pressure output from the linear solenoid (SLS) 202 is supplied to the primary regulator valve 205, the clamping hydraulic pressure control valve 303, the clutch pressure control valve 403, and the fail-safe valve 305. Note that the linear solenoid (SLP) 201 and the linear solenoid (SLS) 202 may be normally closed solenoid valves.

The duty solenoid (DSU) 203 is a normally closed solenoid valve. The duty solenoid (DSU) 203 outputs a controlled hydraulic pressure (output hydraulic pressure) on the basis of an electric current value determined by a duty signal (duty value) transmitted from the ECU 8. The controlled hydraulic pressure output from the duty solenoid (DSU) 203 is supplied to the lock-up control valve 405 and the fail-safe valve 305. Note that the duty solenoid (DSU) 203 may be a normally open solenoid valve.

The on/off solenoid (SL1) 204 is a normally closed solenoid valve. The on/off solenoid (SL1) 204 is switched to an open state in which the controlled hydraulic pressure is output to the clutch apply control valve 401 when an electric current is supplied. The on/off solenoid (SL1) 204 is switched to a closed state in which no controlled hydraulic pressure is output when no electric current is supplied. Note that the on/off solenoid (SL1) 204 may be a normally open solenoid valve.

As shown in FIG. 3, the shift hydraulic pressure control valve 301 is connected to the hydraulic actuator 41c of the primary pulley 41 of the belt-type continuously variable transmission 4 via the fail-safe valve 305. Note that the detail of the fail-safe valve 305 will be described later, and, here, it is assumed that the fail-safe valve 305 is held at a normal position shown at the left half side of the fail-safe valve 305 in FIG. 3.

The shift hydraulic pressure control valve 301 has a spool 311 that is movable in the axial direction. A spring 312 is arranged in a compressed state on one end (lower end in FIG. 3) of the spool 311, and a control hydraulic pressure port 315 is formed at the one end. The above described linear solenoid (SLP) 201 is connected to the control hydraulic pressure port 315, and the controlled hydraulic pressure output from the linear solenoid (SLP) 201 is applied to the control hydraulic pressure port 315.

In addition, the shift hydraulic pressure control valve 301 has an input port 313 and an output port 314. The line pressure PL is supplied to the input port 313. The output port 314 connects (communicates) with the hydraulic actuator 41c of the primary pulley 41 via the fail-safe valve 305.

The shift hydraulic pressure control valve 301 regulates the line pressure PL using the controlled hydraulic pressure, output from the linear solenoid (SLP) 201, as a pilot pressure, and supplies the regulated pressure to the hydraulic actuator 41c of the primary pulley 41. Thus, the hydraulic pressure supplied to the hydraulic actuator 41c of the primary pulley 41 via the fail-safe valve 305 is controlled, and the speed ratio γ of the belt-type continuously variable transmission 4 is controlled.

Specifically, as the controlled hydraulic pressure output from the linear solenoid (SLP) 201 increases from a state where a predetermined hydraulic pressure is supplied to the hydraulic actuator 41c of the primary pulley 41, the spool 311 moves upward in FIG. 3. Thus, the hydraulic pressure supplied to the hydraulic actuator 41c of the primary pulley 41 increases, and then the V-groove width of the primary pulley 41 is narrowed to decrease the speed ratio γ (upshift).

On the other hand, in a state where a predetermined hydraulic pressure is supplied to the hydraulic actuator 41*c* of the primary pulley 41, as the controlled hydraulic pressure output from the linear solenoid (SLP) 201 decreases, the spool 311 moves downward in FIG. 3. Thus, the hydraulic pressure supplied to the hydraulic actuator 41*c* of the primary pulley 41 decreases, and the V-groove width of the primary pulley 41 is widened to increase the speed ratio γ (downshift).

In this case, the speed ratio γ of the belt-type continuously variable transmission 4 is varied on the basis of a rotational speed difference (deviation) between a target input shaft rotational speed and an actual input shaft rotational speed Nin so that the target input shaft rotational speed coincides with the actual input shaft rotational speed. The target input shaft rotational speed is, for example, set on the basis of a vehicle state indicated by an actual vehicle speed V and an accelerator operation amount Acc with reference to a shift map prestored in the ROM 82 of the ECU 8. The shift map represents a shift condition. The shift map is, for example, the relationship between the vehicle speed V and the target input shaft rotational speed using the accelerator operation amount Acc as a parameter. The target input shaft rotational speed is a target input rotational speed of the belt-type continuously variable transmission 4.

As shown in FIG. 3, the clamping hydraulic pressure control valve 303 is connected to the hydraulic actuator 42*c* of the secondary pulley 42 of the belt-type continuously variable transmission 4. The clamping hydraulic pressure control valve 303 has a similar configuration to that of the above described shift hydraulic pressure control valve 301, and the detailed description is omitted.

The above described linear solenoid (SLS) 202 is connected to a control hydraulic pressure port 335 of the clamping hydraulic pressure control valve 303, and the controlled hydraulic pressure output from the linear solenoid (SLS) 202 is applied to the control hydraulic pressure port 335. Then, the clamping hydraulic pressure control valve 303 regulates the line pressure PL using the controlled hydraulic pressure output from the linear solenoid (SLS) 202 as a pilot pressure, and supplies the regulated pressure to the hydraulic actuator 42*c* of the secondary pulley 42. Thus, the hydraulic pressure supplied to the hydraulic actuator 42*c* of the secondary pulley 42 is controlled, and the belt clamping force of the belt-type continuously variable transmission 4 is controlled.

Specifically, in a state where a predetermined hydraulic pressure is supplied to the hydraulic actuator 42*c* of the secondary pulley 42, as the controlled hydraulic pressure output from the linear solenoid (SLS) 202 increases, the spool 331 moves upward in FIG. 3. Thus, the hydraulic pressure supplied to the hydraulic actuator 42*c* of the secondary pulley 42 increases, and the belt clamping force increases.

On the other hand, in a state where a predetermined hydraulic pressure is supplied to the hydraulic actuator 42*c* of the secondary pulley 42, as the controlled hydraulic pressure output from the linear solenoid (SLS) 202 decreases, the spool 331 moves downward in FIG. 3. Thus, the hydraulic pressure supplied to the hydraulic actuator 42*c* of the secondary pulley 42 decreases, and the belt clamping force decreases.

In this case, the clamping hydraulic pressure applied to the hydraulic actuator 42*c* of the secondary pulley 42 is regulated so as to obtain a necessary target belt clamping force, and the belt clamping force of the belt-type continuously variable transmission 4 is varied on the basis of the clamping hydraulic pressure. The necessary target belt clamping force is, for example, set on the basis of a vehicle state that is indicated by an actual accelerator operation amount Acc, a speed ratio γ, and an input shaft rotational speed Nin with reference to a clamping force map prestored in the ROM 82 of the ECU 8. The clamping force map is the relationship that is empirically obtained beforehand so that a belt slip does not occur. The clamping force map uses the accelerator operation amount Acc, the speed ratio γ, and the input shaft rotational speed Nin as parameters.

As shown in FIG. 3, the manual valve 20*g* is connected to hydraulic servos 3C and 3B of the forward clutch C1 and reverse brake B1 of the forward-reverse switching device 3.

The manual valve 20*g* is a switching valve that switches supply of a hydraulic pressure to each of the hydraulic servos 3C and 3B of the forward clutch C1 and reverse brake B1 of the forward-reverse switching device 3 in accordance with operation of the shift lever 9. The manual valve 20*g* is switched in correspondence with shift positions of the shift lever 9, such as the parking position "P", the reverse position "R", the neutral position "N" and the drive position "D".

When the manual valve 20*g* is switched in correspondence with the parking position "P" or neutral position "N" of the shift lever 9, no hydraulic pressure is supplied to the hydraulic servo 3C of the forward clutch C1 or the hydraulic servo 3B of the reverse brake B1. A hydraulic pressure applied to each of the hydraulic servos 3C and 3B of the forward clutch C1 and the reverse brake B1 is drained via the manual valve 20*g*. Thus, both the forward clutch C1 and the reverse brake B1 are released.

When the manual valve 20*g* is switched in correspondence with the reverse position "R" of the shift lever 9, the input port 211 and the output port 213 communicate with each other, and a hydraulic pressure is supplied to the hydraulic servo 3B of the reverse brake B1. On the other hand, the hydraulic pressure applied to the hydraulic servo 3C of the forward clutch C1 is drained via the manual valve 20*g*. Thus, the reverse brake B1 is engaged, and the forward clutch C1 is released.

When the manual valve 20*g* is switched in correspondence with the drive position "D" of the shift lever 9, the input port 211 and the output port 212 communicate with each other, and a hydraulic pressure is supplied to the hydraulic servo 3C of the forward clutch C1. On the other hand, the hydraulic pressure applied to the hydraulic servo 3B of the reverse brake B1 is drained via the manual valve 20*g*. Thus, the forward clutch C1 is engaged, and the reverse brake B1 is released.

As shown in FIG. 3, the clutch apply control valve 401, which is a switching valve for switching supply of a hydraulic pressure to the frictional engagement elements, is connected to the manual valve 20*g*.

The clutch apply control valve 401 is the switching valve that is able to switch supply of a hydraulic pressure to the frictional engagement elements (the forward clutch C1 and the reverse brake B1) of the forward-reverse switching device 3 in correspondence with a transient state where the frictional engagement element is in transition to engagement (during transition to engagement) or a completely engaged state (during engagement) of the frictional engagement elements. For example, when the shift lever 9 is operated from a non-driving position, such as the parking position "P" and the neutral position "N", to a driving position, such as the drive position "D" at the time, for example, when the vehicle starts running, the clutch apply control valve 401 is switched to switch the hydraulic pressure, which is supplied to the hydraulic servo 3C of the forward clutch C1 via the above described manual valve 20*g*, to a transient hydraulic pressure corresponding to a transient state or to a hydraulic pressure for holding engagement, which corresponds to a completely engaged state. Similarly, when the shift lever 9 is operated to the reverse position "R" as well, the clutch apply control valve 401 is switched to switch the hydraulic pressure, which is supplied to the hydraulic servo 3B of the reverse brake B1 via the manual valve 20g, to a transient hydraulic pressure corresponding to a transient state or to a hydraulic pressure for holding engagement, which corresponds to a completely engaged state. Note that, hereinafter, the case in which the clutch apply control valve 401 switches the hydraulic pressure supplied to the forward clutch C1 will be typically described, and the description of the case in which the clutch apply control valve 401 switches the hydraulic pressure supplied to the reverse brake B1 is omitted.

The clutch apply control valve 401 is switched to a transient position shown at the left half side of the clutch apply control valve 401 in FIG. 3 when the forward clutch C1 is in transition to engagement and is switched to an engaged position shown at the right half side of the clutch apply control valve 401 in FIG. 3 when the forward clutch C1 is engaged (completely engaged).

Specifically, the clutch apply control valve 401 has a spool 411 that is movable in the axial direction. A spring 412 is arranged in a compressed state on one end (lower end side in FIG. 3) of the spool 411, and a control hydraulic pressure port 415 is formed at an end portion of the clutch apply control valve 401, at an opposite side to the side, at which the spring 412 is provided, with respect to the spool 411. In addition, a drain port 416 is formed at the one end at which the spring 412 is arranged. The above described on/off solenoid (SL1) 204 is connected to the control hydraulic pressure port 415. The controlled hydraulic pressure output from the on/off solenoid (SL1) 204 is applied to the control hydraulic pressure port 415.

In addition, the clutch apply control valve 401 has input ports 421 and 422 and an output port 423. The input port 421 is connected to the first modulator valve 206. The input port 422 connects (communicates) with an output port 434 of the clutch pressure control valve 403. In addition, the output port 423 connects (communicates) with the input port 211 of the manual valve 20g.

The clutch apply control valve 401 is switched by the on/off solenoid (SL1) 204. Specifically, when the on/off solenoid (SL1) 204 is closed, the clutch apply control valve 401 is switched to an engaged position at which the spring 412 is placed in a state as it was assembled thereto. At this time, the input port 421 and the output port 423 communicate with each other. When the input port 421 and the output port 423 communicate with each other, the first modulator hydraulic pressure PM1 regulated by the first modulator valve 206 is supplied to the hydraulic servo 3C of the forward clutch C1.

On the other hand, in a state where the on/off solenoid (SL1) 204 is open, as the controlled hydraulic pressure is input to the control hydraulic pressure port 415, the clutch apply control valve 401 is switched to the transient position at which the spring 412 is compressed. At this time, the input port 422 and the output port 423 communicate with each other. When the input port 422 and the output port 423 communicate with each other, the hydraulic pressure regulated by the clutch pressure control valve 403 is supplied to the hydraulic servo 3C of the forward clutch C1.

As shown in FIG. 3, the clutch pressure control valve 403 is connected to the clutch apply control valve 401.

The clutch pressure control valve 403 is a pressure regulating valve that regulates a transient hydraulic pressure applied to the forward clutch C1 using the controlled hydraulic pressure output from the linear solenoid (SLS) 202 as a pilot pressure.

The clutch pressure control valve 403 has a spool 431 that is movable in the axial direction. A spring 432 is arranged in a compressed state on one end (upper end side in FIG. 3) of the spool 431, and a control hydraulic pressure port 435 is formed at an end portion of the clutch pressure control valve 403, at an opposite side to the side, at which the spring 432 is provided, with respect to the spool 431. The above described linear solenoid (SLS) 202 is connected to the control hydraulic pressure port 435, and the controlled hydraulic pressure output from the linear solenoid (SLS) 202 is applied to the control hydraulic pressure port 435.

In addition, the clutch pressure control valve 403 has an input port 433 and an output port 434. The input port 433 is supplied with the first modulator hydraulic pressure PM1 regulated by the first modulator valve 206. The output port 434 connects (communicates) with the input port 422 of the clutch apply control valve 401.

When the clutch apply control valve 401 is placed in the transient position, a hydraulic pressure output from the output port 434 of the clutch pressure control valve 403 is supplied to the hydraulic servo 3C of the forward clutch C1 via the manual valve 20g. In other words, when the forward clutch C1 is in transition to engagement, a transient hydraulic pressure supplied to the forward clutch C1 is controlled by the clutch pressure control valve 403.

In this case, as the controlled hydraulic pressure output from the linear solenoid (SLS) 202 increases, the spool 431 moves upward in FIG. 3 against the elastic force of the spring 432. Thus, the hydraulic pressure output from the output port 434 increases, and the transient hydraulic pressure applied to the forward clutch C1 increases. On the other hand, as the controlled hydraulic pressure output from the linear solenoid (SLS) 202 decreases, the spool 431 moves downward in FIG. 3 by the elastic force of the spring 432. Thus, the hydraulic pressure output from the output port 434 decreases, and the transient hydraulic pressure applied to the forward clutch C1 decreases.

As shown in FIG. 3, the lock-up control valve 405 is connected to the engagement side fluid chamber 25 and release side fluid chamber 26 of the lock-up clutch 24.

The lock-up control valve 405 controls engagement and release of the lock-up clutch 24. Specifically, the lock-up control valve 405 controls a lock-up differential pressure (=(hydraulic pressure in the engagement side fluid chamber 25)−(hydraulic pressure in the release side fluid chamber 26)) to control engagement and release of the lock-up clutch 24.

The lock-up control valve 405 has a spool 451 that is movable in the axial direction. A spring 452 is arranged in a compressed state on one end (lower end side in FIG. 3) of the spool 451, and a control hydraulic pressure port 455 is formed at an end portion of the lock-up control valve 405, at an opposite side to the side, at which the spring 452 is provided, with respect to the spool 451. In addition, a backup port 456 and a feedback port 457 are formed at the one end at which the spring 452 is arranged. The above described duty solenoid (DSU) 203 is connected to the control hydraulic pressure port 455, and the controlled hydraulic pressure output from the duty solenoid (DSU) 203 is applied to the control hydraulic pressure port 455. In addition, the lock-up control valve 405 has input ports 461 and 462, an output port 465, input/output ports 463 and 464 and a drain port 466.

The input ports 461 and 462 each are connected to a secondary regulator valve (not shown) that is connected to the primary regulator valve 205. Then, a secondary hydraulic pressure PSEC regulated by the secondary regulator valve is input through the input ports 461 and 462.

The input/output port 463 connects (communicates) with the engagement side fluid chamber 25 of the lock-up clutch 24. The input/output port 464 connects (communicates) with the release side fluid chamber 26 of the lock-up clutch 24. In addition, the backup port 456 is connected to the above described on/off solenoid (SL1) 204.

The lock-up control valve 405 controls engagement and release of the lock-up clutch 24 as in the following manner.

As the hydraulic pressure controlled by the duty solenoid (DSU) 203 is introduced into the control hydraulic pressure port 455, the lock-up control valve 405 is placed in a state (on state) where the spool 451 is moved downward against the elastic force of the spring 452 in accordance with the controlled hydraulic pressure. In this case, as the controlled hydraulic pressure increases, the spool 451 further moves downward. The right half side of the lock-up control valve 405 in FIG. 3 shows a state where the spool 451 is fully moved downward. In a state shown at the right half side of the lock-up control valve 405 shown in FIG. 3, the input port 461 and the input/output port 463 communicate with each other, and the input/output port 464 and the drain port 466 communicate with each other. At this time, the lock-up clutch 24 is placed in a completely engaged state.

When the lock-up control valve 405 is in an on state, the spool 451 slides upward or downward on the basis of a balance between the forces applied to the spool 451 respectively from the upper side and lower side of the spool 451. The force applied from the upper side of the spool 451 is the resultant force based on the hydraulic pressure controlled by the duty solenoid (DSU) 203, introduced to the control hydraulic pressure port 455, and the hydraulic pressure introduced to the input/output port 464 (hydraulic pressure in the release side fluid chamber 26). The force applied from the lower side of the spool 451 is the resultant force of the force applied to the spool 451 based on the hydraulic pressure introduced to the feedback port 457 (hydraulic pressure in the engagement side fluid chamber 25) and the elastic force of the spring 452. Here, the lock-up clutch 24 is engaged or released on the basis of a lock-up differential pressure. The lock-up differential pressure is controlled by controlling the hydraulic pressure controlled by the duty solenoid (DSU) 203. The degree of engagement of the lock-up clutch 24 (clutch capacity of the lock-up clutch 24) may be continuously varied in accordance with the lock-up differential pressure.

More specifically, as the hydraulic pressure controlled by the duty solenoid (DSU) 203 is increased, the lock-up differential pressure increases, and the degree of engagement of the lock-up clutch 24 increases. In this case, hydraulic fluid is supplied from the secondary regulator valve to the engagement side fluid chamber 25 of the lock-up clutch 24 via the input port 461 and the input/output port 463. On the other hand, hydraulic fluid in the release side fluid chamber 26 is drained through the input/output port 464 and the drain port 466. Then, when the lock-up differential pressure is larger than or equal to a predetermined value, the lock-up clutch 24 is completely engaged as described above.

Conversely, as the hydraulic pressure controlled by the duty solenoid (DSU) 203 decreases, the lock-up differential pressure decreases, and the degree of engagement of the lock-up clutch 24 decreases. In this case, hydraulic fluid from the secondary regulator valve is supplied to the release side fluid chamber 26 via the input port 462 and the input/output port 464. On the other hand, hydraulic fluid in the engagement side fluid chamber 25 is drained through the input/output port 463 and the output port 465. Then, as the lock-up differential pressure attains a negative value, the lock-up clutch 24 is released.

Then, when supply of the hydraulic pressure controlled by the duty solenoid (DSU) 203 to the control hydraulic pressure port 455 is stopped, as shown at the left half side of the lock-up control valve 405 in FIG. 3, the lock-up control valve 405 is placed in a state (off state) where the spool 451 is moved upward by the elastic force of the spring 452 and held in an original position. In this off state, the input port 462 and the input/output port 464 communicate with each other, and the input/output port 463 and the output port 465 communicate with each other. At this time, the lock-up clutch 24 is released.

In addition, when the above described on/off solenoid (SL1) 204 is open, the controlled hydraulic pressure is introduced to the backup port 456. Thus, the above described engagement and release of the lock-Lip clutch 24 are not controlled, and the lock-up clutch 24 is forcibly released.

Next, the fail-safe valve 305 will be described. The fail-safe valve 305 is interposed between the hydraulic actuator 41c of the primary pulley 41 of the belt-type continuously variable transmission 4 and the shift hydraulic pressure control valve 301. The fail-safe valve 305 is a switching valve that switches a hydraulic pressure supplied to the hydraulic actuator 41c of the primary pulley 41 on the basis of whether a rapid deceleration state is likely to occur in the belt-type continuously variable transmission 4. Specifically, the fail-safe valve 305 is switched to a fail position shown at the right half side of the fail-safe valve 305 in FIG. 3 when a rapid deceleration state is likely to occur in the belt-type continuously variable transmission 4, and is switched to a normal position shown at the left half side of the fail-safe valve 305 in FIG. 3 during normal times when a rapid deceleration state is not likely to occur.

The fail-safe valve 305 has a spool 351 that is movable in the axial direction. A spring 352 is arranged in a compressed state on one end (lower end side in FIG. 3) of the spool 351, and a first control hydraulic pressure port 355 and a second control hydraulic pressure port 356 are formed at an end portion of the fail-safe valve 305, at an opposite side to the side, at which the spring 352 is provided, with respect to the spool 351. A drain port 357 is formed at the one end at which the spring 352 is arranged.

The above described linear solenoid (SLS) 202 is connected to the first control hydraulic pressure port 355, and the controlled hydraulic pressure output from the linear solenoid (SLS) 202 is applied to the first control hydraulic pressure port 355. The hydraulic pressure controlled by the linear solenoid (SLS) 202, introduced to the first control hydraulic pressure port 355, acts on the spool 351 in a direction opposite to a direction in which the elastic force of the spring 352 acts.

The above described duty solenoid (DSU) 203 is connected to the second control hydraulic pressure port 356, and the controlled hydraulic pressure output from the duty solenoid (DSU) 203 is applied to the second control hydraulic pressure port 356. The hydraulic pressure controlled by the duty solenoid (DSU) 203, introduced to the second control hydraulic pressure port 356, acts on the spool 351 in a direction opposite to a direction in which the elastic force of the spring 352 acts. More specifically, the active area (pressure receiving area) in which the hydraulic pressure controlled by the duty solenoid (DSU) 203 acts on the spool 351 upward in FIG. 3 is different from the active area in which the hydraulic pressure controlled by the duty solenoid (DSU) 203 acts on the spool 351 downward in FIG. 3. That is, the active area in which the hydraulic pressure controlled by the duty solenoid (DSU) 203 acts on the spool 351 in the same direction as the direction in which the elastic force of the spring 352 acts is different from the active area in which the hydraulic pressure controlled by the duty solenoid (DSU) 203 acts on the spool 351 in the direction opposite to the direction in which the elastic force of the spring 352 acts. In this case, the active area in which the controlled hydraulic pressure acts on the spool 351 in the direction opposite to the direction in which the elastic force of the spring 352 acts is larger than the active area in which the controlled hydraulic pressure acts on the spool 351 in the same direction as the direction in which the elastic force of the spring 352 acts. Thus, the direction in which the hydraulic pressure controlled by the duty solenoid (DSU) 203 acts on the spool 351 is the same as the direction in which the hydraulic pressure controlled by the linear solenoid (SLS) 202 acts on the spool 351.

In addition, the fail-safe valve 305 has input ports 361 and 362 and an output port 363. The input port 361 connects (communicates) with the output port 314 of the above described shift hydraulic pressure control valve 301, and the hydraulic pressure regulated by the shift hydraulic pressure control valve 301 is introduced through the input port 361. The line pressure PL regulated by the primary regulator valve 205 is introduced through the input port 362. The output port 363 connects (communicates) with the hydraulic actuator 41c of the primary pulley 41.

Then, when the fail-safe valve 305 is held in a normal position shown at the left half side of the fail-safe valve 305 in FIG. 3, the input port 361 and the output port 363 communicate with each other. Thus, a hydraulic pressure regulated by the shift hydraulic pressure control valve 301 is supplied to the hydraulic actuator 41c of the primary pulley 41. On the other hand, when the fail-safe valve 305 is held in a fail position shown at the right half side of the fail-safe valve 305 in FIG. 3, the input port 362 and the output port 363 communicate with each other. Thus, the line pressure PL is supplied to the hydraulic actuator 41c of the primary pulley 41.

In the present embodiment, switching between the normal position and fail position of the fail-safe valve 305 is controlled by a combination of hydraulic pressures controlled by the existing two or more electromagnetic valves. Specifically, the fail-safe valve 305 is switched by a combination of a hydraulic pressure PSLS controlled by the linear solenoid (SLS) 202, supplied to the first control hydraulic pressure port 355, and a hydraulic pressure PDSU controlled by the duty solenoid (DSU) 203, supplied to the second control hydraulic pressure port 356. Hereinafter, switching of the fail-safe valve 305 will be described.

As described above, the hydraulic pressure PSLS controlled by the linear solenoid (SLS) 202, supplied from the first control hydraulic pressure port 355, and the hydraulic pressure PDSU controlled by the duty solenoid (DSU) 203, supplied from the second control hydraulic pressure port 356, both act on the spool 351 as a force against the elastic force of the spring 352. Thus, when the resultant force of the two controlled hydraulic pressures PSLS and PDSU, acting on the spool 351, is lower than or equal to the elastic force of the spring 352, the fail-safe valve 305 is held in the normal position, and the hydraulic pressure output from the shift hydraulic pressure control valve 301 is supplied to the hydraulic actuator 41c of the primary pulley 41. On the other hand, when the resultant force exceeds the elastic force of the spring 352, the fail-safe valve 305 is switched to the fail position, and the line pressure PL is supplied to the hydraulic actuator 41c of the primary pulley 41.

That is, when the resultant force exceeds a predetermined reference value, the fail-safe valve 305 is switched from the normal position to the fail position. On the other hand, when the resultant force is lower than or equal to the reference value, the fail-safe valve 305 is switched from the fail position to the normal position. In accordance with the switching operation, a hydraulic pressure supplied to the hydraulic actuator 41c of the primary pulley 41 is switched between the hydraulic pressure output from the shift hydraulic pressure control valve 301 and the line pressure PL. Here, if the active area in which the controlled hydraulic pressure PSLS acts on the spool 351 is equal to the active area in which the controlled hydraulic pressure PDSU acts on the spool 351, the fail-safe valve 305 is switched from the normal position to the fail position when the total of the two controlled hydraulic pressures PSLS and PDSU exceeds a predetermined reference pressure, whereas the fail-safe valve 305 is switched from the fail position to the normal position when the total is lower than or equal to the reference pressure.

When a rapid deceleration state is likely to occur in the belt-type continuously variable transmission 4, the ECU 8 controls the linear solenoid (SLS) 202 and the duty solenoid (DSU) 203 to switch the fail-safe valve 305 to the fail position. On the other hand, when a rapid deceleration state is not likely to occur in the belt-type continuously variable transmission 4, the ECU 8 controls the linear solenoid (SLS) 202 and the duty solenoid (DSU) 203 to hold the fail-safe valve 305 in the normal position.

A rapid deceleration state is likely to occur in the belt-type continuously variable transmission 4, for example, when a hydraulic pressure applied to the hydraulic actuator 41c of the primary pulley 41 steeply decreases. This is, for example, because the shift hydraulic pressure control valve 301 or the linear solenoid (SLP) 201 that controls the shift hydraulic pressure control valve 301 fails. A failure of the shift hydraulic pressure control valve 301 or the linear solenoid (SLP) 201 includes a failure due to a mechanical factor, such as a valve stick, or a failure due to an electrical factor, such as a disconnection or a short-circuit.

It may be determined in the following manner whether a rapid deceleration state is likely to occur in the belt-type continuously variable transmission 4. For example, it may be determined on the basis of a deviation between a target speed ratio and actual speed ratio of the belt-type continuously variable transmission 4. When the deviation is larger than or equal to a predetermined value, it may be determined that a rapid deceleration state is likely to occur. The actual speed ratio of the belt-type continuously variable transmission 4 may be calculated on the basis of a signal output from the primary pulley rotational speed sensor 105 and a signal output from the the basis of a variation (amount of decrease) in hydraulic pressure applied to the hydraulic actuator 41c of the primary pulley 41. When the variation is larger than or equal to a predetermined value, it may be determined that a rapid deceleration state is likely to occur. A hydraulic pressure applied to the hydraulic actuator 41c may be detected by providing a pressure sensor. In addition, when a disconnection, a short-circuit, or the like, of the shift hydraulic pressure control valve 301 or the linear solenoid (SLP) 201 is detected, it may be determined that a rapid deceleration state is likely to occur. A failure due to an electrical factor, such as a disconnection or a short-circuit, may be detected by the ECU 8.

According to the present embodiment, it is possible to suppress a steep decrease in hydraulic pressure applied to the hydraulic actuator 41c of the primary pulley 41 of the belt-type continuously variable transmission 4. Thus, it is possible to avoid occurrence of a rapid deceleration state. That is, it is possible to suppress a variation in the speed ratio γ to the deceleration side by introducing the line pressure PL to the hydraulic actuator 41c. Then, it is possible to prevent a belt slip, an overrevolution, an axle lock, or the like, that may occur in accordance with a rapid deceleration. In addition, because the existing electromagnetic valves (the linear solenoid (SLS) 202 and the duty solenoid (DSU) 203) are used for switching the fail-safe valve 305, it is possible to avoid an increase in cost and an increase in size of the system.

Incidentally, it is conceivable that the fail-safe valve 305 is switched not by two or more electromagnetic valves but only by one electromagnetic valve. For example, it is conceivable that the fail-safe valve 305 is switched only by the linear solenoid (SLS) 202. However, in this case, in regard to the hydraulic pressure PSLS controlled by the linear solenoid (SLS) 202, a range used to switch the fail-safe valve 305 (range used in the event of a failure) needs to be set to a high-pressure side than a range used during normal times (range used for controlling a belt clamping force of the belt-type continuously variable transmission 4, or the like). Thus, the following problem arises.

When the maximum pressure of the linear solenoid (SLS) 202 is increased to ensure the range used in the even of a failure, the source pressure (here, first modulator hydraulic pressure PM1) of the linear solenoid (SLS) 202 needs to be increased. Thus, the flow rate consumed by the linear solenoid (SLS) 202 increases. This may adversely affects the discharge capacity of the pump. In addition, when the range used in the event of a failure is ensured without increasing the maximum pressure of the linear solenoid (SLS) 202, the range used during normal times is narrowed. Thus, it is necessary to increase a control gain of the linear solenoid (SLS) 202. For this reason, variations in the hydraulic pressure PSLS controlled by the linear solenoid (SLS) 202 occur, and, as a result, the controllability may deteriorate.

In contrast, in the present embodiment, the following configuration is employed to eliminate the above described problem in accordance with setting of the range used in the event of a failure. That is, the above reference value is set so that the fail-safe valve 305 may be switched to the fail position when both two controlled hydraulic pressures PSLS and PDSU are maximum pressures or hydraulic pressures close to the maximum pressures. In other words, in regard to each of the control hydraulic pressures PSLS and PDSU, the range around a maximum pressure (hereinafter, including the maximum pressure) is set as the range used in the event of a failure.

In this way, both the linear solenoid (SLS) 202 and the duty solenoid (DSU) 203 are used to switch the fail-safe valve 305. Thus, in comparison with the case in which the fail-safe valve 305 is switched by a single solenoid, it is possible to narrow the range used in the event of a failure, the range being set for each of the controlled hydraulic pressures PSLS and PDSU. Hence, it is possible to suppress an increase in source pressure of each of the linear solenoid (SLS) 202 and the duty solenoid (DSU) 203 in accordance with setting of the range used in the event of a failure, and, as a result, it is possible to suppress the flow rate consumed by each of the linear solenoid (SLS) 202 and the duty solenoid (DSU) 203. In addition, it is possible to suppress an increase in control gain of each of the linear solenoid (SLS) 202 and the duty solenoid (DSU) 203 in accordance with setting of the range used in the event of a failure, and, therefore, it is possible to suppress deterioration of controllability of each of the controlled hydraulic pressures PSLS and PDSU.

Here, in regard to each of the controlled hydraulic pressures PSLS and PDSU, the range used in the event of a failure may overlap the range used during normal times, or the range used in the event of a failure may be separated from the range used during normal times. This is because, during normal times when a rapid deceleration state is not likely to occur in the belt-type continuously variable transmission 4, there is no possibility that two controlled hydraulic pressures PSLS and PDSU both are controlled to about maximum hydraulic pressures in the range used in the event of a failure.

More specifically, during normal times, the hydraulic pressure PSLS controlled by the linear solenoid (SLS) 202 attains a hydraulic pressure close to a maximum pressure when the speed ratio $\gamma$ of the belt-type continuously variable transmission 4 is at the maximum side (lowest speed side) and torque amplification of the torque converter 2 is maximum (stalled state). At this time, the lock-up clutch 24 is controlled to a released state or a half engaged state (slipped state) in which the clutch capacity is small, so the hydraulic pressure PDSU controlled by the duty solenoid (DSU) 203 will not be a hydraulic pressure around a maximum pressure. Thus, in this case, the controlled hydraulic pressure PDSU is controlled to a hydraulic pressure lower than that in the range used in the event of a failure.

In addition, in the present embodiment, the linear solenoid (SLS) 202 controls the transient hydraulic pressure of the forward clutch C1. During the control for transition to engagement, because the lock-up clutch 24 is controlled to a released state, the hydraulic pressure PDSU controlled by the duty solenoid (DSU) 203 will not be a hydraulic pressure around a maximum pressure. Thus, when the control for transition to engagement of the forward clutch C1 is performed during normal times, the controlled hydraulic pressure PDSU is controlled to a hydraulic pressure lower than that in the range used in the event of a failure.

On the other hand, when the hydraulic pressure PDSU controlled by the duty solenoid (DSU) 203 is a hydraulic pressure around a maximum pressure, the lock-up clutch 24 is completely engaged. In this state, there is no torque amplification of the torque converter 2, so the hydraulic pressure PSLS controlled by the linear solenoid (SLS) 202 will not be a hydraulic pressure around a maximum pressure. Thus, in this case, the controlled hydraulic pressure PSLS is controlled to a hydraulic pressure lower than that in the range used in the event of a failure.

In this way, the fail-safe valve 305 is switched to the fail position by a combination of controlled states of the linear solenoid (SLS) 202 and duty solenoid (DSU) 203, and the controlled states are not used during normal times. Thus, in regard to each of the controlled hydraulic pressures PSLS and PDSU, even when the range used in the event of a failure overlaps the range used during normal times, the controlled hydraulic pressures PSLS and PDSU each, during normal times, will not be controlled to a hydraulic pressure in the range used in the event of a failure, and the fail-safe valve 305 will not be switched to the fail position. That is, even when the range used in the event of a failure overlaps the range used during normal times, it does not interfere with control during normal times. Then, the range used in the event of a failure is configured to overlap the range used during normal times. Thus, it is possible to prevent an increase in source pressure of each of the linear solenoid (SLS) 202 and the duty solenoid (DSU) 203, and it is possible to prevent an increase in control gain of each of the linear solenoid (SLS) 202 and the duty solenoid (DSU) 203.

Next, control for returning the tail-safe valve 305 to the normal position will be described. As described above, by switching the fail-safe valve 305 to the fail position, a variation in the speed ratio $\gamma$ to the deceleration side (low speed side) is suppressed in the even of a failure. However, if a hydraulic pressure introduced to the hydraulic actuator 41c of the primary pulley 41 is excessively high, the speed ratio $\gamma$ may reversely vary to the acceleration side (high speed side). In addition, even when a rapid deceleration may be prevented in a driving state (power on state) by a hydraulic pressure introduced to the hydraulic actuator 41c of the primary pulley 41, the speed ratio γ may vary to the acceleration side in a driven state (power off state). Thus, when the vehicle stops in a state where the speed ratio γ is varied to the acceleration side, driving force may possibly be insufficient at the time when the vehicle starts running again.

Then, in the present embodiment, when the vehicle speed V is lower than or equal to a predetermined vehicle speed, the ECU 8 controls the linear solenoid (SLS) 202 and the duty solenoid (DSU) 203 to return the fail-safe valve 305 to the normal position, thus returning to the control during normal times to prepare for starting the vehicle to run again. By so doing, the fail-safe valve 305 is returned to a state before being switched to the fail position, so the line pressure PL is not introduced to the hydraulic actuator 41c of the primary pulley 41. Thus, a variation in the speed ratio γ to the acceleration side is inhibited. Then, the hydraulic actuator 41c of the primary pulley 41 decreases, and the speed ratio γ varies to the deceleration side again. Thus, when the vehicle stops, the vehicle may start running again in a state where the speed ratio is set in a full deceleration state or a state close to the full deceleration state. As a result, it is possible to avoid a situation that driving force is insufficient. Furthermore, when the speed ratio γ needs to be varied to the acceleration side after the vehicle starts running again, it is only necessary that the fail-safe valve 305 is switched to the fail position to introduce the line pressure PL to the hydraulic actuator 41c of the primary pulley 41.

Here, the condition that the fail-safe valve 305 is returned to the normal position, that is, the condition for determining whether the vehicle speed V is lower than or equal to a predetermined vehicle speed, is specifically set as follows. When the fail-safe valve 305 is returned to the normal position, the belt-type continuously variable transmission 4 is placed in a deceleration state. Therefore, there is a risk that an overrevolution occurs or an axle locks. For this reason, it is desirable that the predetermined vehicle speed is set at a value such that an overrevolution does not occur when the fail-safe valve 305 is returned to the normal position. That is, it is desirable that the predetermined vehicle is set at a value such that the engine rotational speed Ne does not exceed a predetermined allowable rotational speed even when the belt-type continuously variable transmission 4 is at a maximum speed ratio. Alternatively, it is desirable that the predetermined vehicle speed is set at a value such that an axle does not lock when the fail-safe valve 305 is returned to the normal position.

The embodiment of the invention is described above; however, the above described embodiment is illustrative and may be modified into various forms. In the above embodiment, the line pressure PL is supplied to the hydraulic actuator 41c of the primary pulley 41 in the event of a failure. Instead of the line pressure PL, a hydraulic pressure output from the clamping hydraulic pressure control valve 303 may be supplied to the hydraulic actuator 41c. Alternatively, a hydraulic pressure other than the above, for example, the first modulator hydraulic pressure PM1, the second modulator hydraulic pressure PM2, or the secondary hydraulic pressure PSEC, may be supplied to the hydraulic actuator 41c.

In the above embodiment, the fail-safe valve 305 is switched by the existing linear solenoid (SLS) 202 and the duty solenoid (DSU) 203. Instead, the fail-safe valve 305 may be switched by a combination of the existing electromagnetic valves other than the above. In this case, not only two existing electromagnetic valves but also three or more existing electromagnetic valves may be used. Thus, the fail-safe valve 305 is switched using the existing configuration, so it is possible to avoid an increase in cost and an increase in size of the system.

In the above embodiment, the linear solenoid (SLS) 202 is used to execute control for regulating the hydraulic pressure output from the clamping hydraulic pressure control valve 303, control for regulating the line pressure PL, control for transition to engagement of the forward clutch C1 and control for switching the fail-safe valve 305; however, it is not limited to this case. The control for regulating the line pressure PL or the control for transition to engagement of the forward clutch C1 may be executed using another electromagnetic valve.

In addition, the control for engagement and release of the lock-up clutch 24 may be executed not by the duty solenoid (DSU) 203 but by a linear solenoid. In this case, the control for switching the fail-safe valve 305 may be executed by the above linear solenoid and the linear solenoid (SLS) 202.

In the above embodiment, when both the hydraulic pressure PSLS controlled by the linear solenoid (SLS) 202 and the hydraulic pressure PDSU controlled by the duty solenoid (DSU) 203 are maximum pressures or hydraulic pressures close to the maximum pressures, the fail-safe valve 305 is switched to the fail position. Instead, it may also be configured so that, when both the hydraulic pressure PSLS controlled by the linear solenoid (SLS) 202 and the hydraulic pressure PDSU controlled by the duty solenoid (DSU) 203 are maximum pressures, the fail-safe valve 305 is switched to the fail position. In addition, it may also be configured so that, when one of the hydraulic pressure PSLS controlled by the linear solenoid (SLS) 202 and the hydraulic pressure PDSU controlled by the duty solenoid (DSU) 203 is a maximum pressure, and the other one is a hydraulic pressure close to a maximum pressure, the fail-safe valve 305 is switched to the fail position.

In the above embodiment, a rapid deceleration state is likely to occur in the belt-type continuously variable transmission 4 when a hydraulic pressure applied to the hydraulic actuator 41c of the primary pulley 41 steeply decreases. A rapid deceleration state may also be likely to occur, for example, when a hydraulic pressure applied to the hydraulic actuator 42c of the secondary pulley 42 steeply increases because of a failure of the clamping hydraulic pressure control valve 303 or the linear solenoid (SLS) 202 that controls the clamping hydraulic pressure control valve 303.

In this case, to avoid a rapid deceleration, it is only necessary to employ the following configuration. A fail-safe valve is provided between the hydraulic actuator 42c of the secondary pulley 42 and the clamping hydraulic pressure control valve 303. The fail-safe valve is switched to a fail position in which a hydraulic pressure lower than the line pressure PL (the first modulator hydraulic pressure PM1, the second modulator hydraulic pressure PM2, or the like) is supplied to the hydraulic actuator 42c of the secondary pulley 42 when a rapid deceleration state is likely to occur in the belt-type continuously variable transmission 4, and the fail-safe valve is switched to a normal position in which a hydraulic pressure output from the clamping hydraulic pressure control valve 303 is supplied to the hydraulic actuator 42c of the secondary pulley 42 during times other than the above. Then, the fail-safe valve is switched using the hydraulic pressure controlled by the linear solenoid (SLP) 201 and the hydraulic pressure controlled by the duty solenoid (DSU) 203. With the above configuration, it is possible to suppress a steep increase in hydraulic pressure applied to the hydraulic actuator 42c of the secondary pulley 42 of the belt-type continuously variable transmission 4, thus making it possible to avoid occurrence of a rapid deceleration state. That is, it is possible to suppress a variation in the speed ratio γ to the deceleration side by a relatively low hydraulic pressure introduced to the hydraulic actuator 42c. Then, it is possible to prevent a belt slip, an overrevolution, an axle lock, or the like, that may occur in accordance with a rapid deceleration.

In the above description, the aspects of the invention are applied to a power train for a vehicle equipped with a gasoline engine; however, the aspects of the invention are not limited to it. Instead, the aspects of the invention may be applied to a power train for a vehicle equipped with another type of engine, such as a diesel engine. In addition, the power source of the vehicle may be, other than the engine (internal combustion engine), an electric motor or a hybrid power source that includes both an engine and an electric motor.

The aspects of the invention are not limited to the FF (front-engine front-drive) vehicle. The aspects of the invention may also be applied to an FR (front-engine rear-drive) vehicle or a four-wheel drive vehicle.

While the invention has been described with reference to an example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are example, other combinations and configurations, including more, less or only a single element, are also within the scope of the invention.

What is claimed is:

1. A hydraulic control system of a vehicle power train including a belt-type continuously variable transmission that clamps a belt using a hydraulic pressure to transmit power and that changes belt winding diameters to vary speed ratios, and a hydraulic lock-up clutch that is provided for a fluid power transmission device arranged between a power source and the belt-type continuously variable transmission and that directly couples the power source to the belt-type continuously variable transmission, comprising:
    a line pressure control valve that regulates a line pressure, which is a source pressure of hydraulic pressures used at various portions;
    a first control valve that outputs a hydraulic pressure supplied to one of a drive pulley and a driven pulley of the belt-type continuously variable transmission;
    a first electromagnetic valve that controls the hydraulic pressure output from the first control valve;
    a second control valve that outputs a hydraulic pressure supplied to the other one of the drive pulley and the driven pulley;
    a second electromagnetic valve that controls the hydraulic pressure output from the second control valve;
    a third electromagnetic valve that controls an engagement pressure of the lock-up clutch; and
    a fail-safe valve that switches a hydraulic pressure supplied to the one of the drive pulley and the driven pulley between the hydraulic pressure output from the first control valve and the line pressure, wherein
    the fail-safe valve is switched to a fail position in which the line pressure is supplied to the one of the drive pulley and the driven pulley when a rapid deceleration state is likely to occur in the belt-type continuously variable transmission,
    the fail-safe valve is switched to a normal position in which the hydraulic pressure output from the first control valve is supplied to the one of the drive pulley and the driven pulley during normal times other than times when a rapid deceleration state is likely to occur in the belt-type continuously variable transmission, and
    the fail-safe valve is switched by a combination of a hydraulic pressure controlled by the second electromagnetic valve and a hydraulic pressure controlled by the third electromagnetic valve.

2. The hydraulic control system according to claim 1, wherein
    a rapid deceleration state is likely to occur in the belt-type continuously variable transmission when a hydraulic pressure supplied to the one of the drive pulley and the driven pulley decreases.

3. The hydraulic control system according to claim 1, wherein
    a rapid deceleration state is likely to occur in the belt-type continuously variable transmission when a hydraulic pressure supplied to the other one of the drive pulley and the driven pulley increases.

4. The hydraulic control system according to claim 1, wherein
    the fail-safe valve is switched to the fail position when both the hydraulic pressure controlled by the second electromagnetic valve and the hydraulic pressure controlled by the third electromagnetic valve are maximum pressures or hydraulic pressures close to the maximum pressures.

5. The hydraulic control system according to claim 4, wherein
    in regard to each of the hydraulic pressure controlled by the second electromagnetic valve and the hydraulic pressure controlled by the third electromagnetic valve, a range used to switch the fail-safe valve to the fail position overlaps a range used for control during normal times.

6. The hydraulic control system according to claim 1, wherein
    in a state where the fail-safe valve is placed in the fail position, when a vehicle speed is lower than or equal to a predetermined vehicle speed, the fail-safe valve is returned to the normal position.

7. The hydraulic control system according to claim 6, wherein
    the predetermined vehicle speed is set at a value such that an overrevolution does not occur when the fail-safe valve is returned to the normal position.

8. The hydraulic control system according to claim 6, wherein
    the predetermined vehicle speed is set at a value such that an axle does not lock when the fail-safe valve is returned to the normal position.

9. The hydraulic control system according to claim 1, wherein
    the vehicle power train is equipped with a hydraulic frictional engagement element that is engaged to form a power transmission path for driving a vehicle, and wherein the second electromagnetic valve controls a transient hydraulic pressure supplied to the frictional engagement element when the frictional engagement element is in transition to engagement.

10. The hydraulic control system according to claim 9, wherein
    in a state where the frictional engagement element is completely engaged, when a rapid deceleration state is likely to occur in the belt-type continuously variable transmission, a hydraulic pressure supplied to the frictional engagement element for holding engagement of the frictional engagement element is supplied to the one of the drive pulley and the driven pulley, instead of the line pressure.

11. The hydraulic control system according to claim 1, wherein when a rapid deceleration state is likely to occur in the belt-type continuously variable transmission, the hydraulic pressure output from the second control valve is supplied to the one of the drive pulley and the driven pulley, instead of the line pressure.

12. The hydraulic control system according to claim 1, wherein when a rapid deceleration state is likely to occur in the belt-type continuously variable transmission, a source pressure of any one of the first to third electromagnetic valves is supplied to the one of the drive pulley and the driven pulley, instead of the line pressure.

* * * * *